(12) United States Patent
Liao et al.

(10) Patent No.: US 9,552,420 B2
(45) Date of Patent: Jan. 24, 2017

(54) FEATURE ENGINEERING AND USER BEHAVIOR ANALYSIS

(75) Inventors: Wenhui Liao, Minneapolis, MN (US); Khalid Al-Kofahi, Rosemount, MN (US); Isabelle Moulinier, Richfield, MN (US)

(73) Assignee: Thomson Reuters Global Resources (CH)

( * ) Notice: Subject to any disclaimer, the term of this patent is extended or adjusted under 35 U.S.C. 154(b) by 0 days.

(21) Appl. No.: 12/793,846

(22) Filed: Jun. 4, 2010

(65) Prior Publication Data

US 2010/0312764 A1 Dec. 9, 2010

Related U.S. Application Data

(63) Continuation-in-part of application No. 11/538,749, filed on Oct. 4, 2006.

(60) Provisional application No. 60/723,322, filed on Oct. 4, 2005, provisional application No. 61/184,693, filed on Jun. 5, 2009.

(51) Int. Cl.
*G06F 17/30* (2006.01)
*G06Q 10/10* (2012.01)

(52) U.S. Cl.
CPC ... *G06F 17/30864* (2013.01); *G06F 17/30646* (2013.01); *G06F 17/30722* (2013.01); *G06Q 10/10* (2013.01)

(58) Field of Classification Search
CPC .................. G06F 17/30722; G06F 17/30864
USPC .................. 707/732–734, 765–768, 723
See application file for complete search history.

(56) References Cited

U.S. PATENT DOCUMENTS

| | | | |
|---|---|---|---|
| 6,256,627 B1 * | 7/2001 | Beattie | G06F 17/30864 |
| 6,289,342 B1 * | 9/2001 | Lawrence et al. | |
| 6,564,213 B1 * | 5/2003 | Ortega et al. | |
| 6,640,218 B1 * | 10/2003 | Golding et al. | |
| 6,772,149 B1 * | 8/2004 | Morelock et al. | |
| 2002/0046286 A1 * | 4/2002 | Caldwell et al. | 709/229 |
| 2002/0184186 A1 * | 12/2002 | Imaichi | G06F 17/30011 |
| 2003/0078914 A1 * | 4/2003 | Witbrock | 707/3 |
| 2003/0101181 A1 * | 5/2003 | Al-Kofahi et al. | 707/7 |
| 2003/0105682 A1 * | 6/2003 | Dicker et al. | 705/27 |
| 2004/0093282 A1 * | 5/2004 | Buczak et al. | 705/27 |
| 2004/0230598 A1 * | 11/2004 | Robertson et al. | 707/102 |
| 2005/0102282 A1 * | 5/2005 | Linden | G06F 17/3053 |
| 2005/0149343 A1 * | 7/2005 | Rhoads et al. | 705/1 |
| 2005/0203899 A1 * | 9/2005 | Anderson et al. | 707/5 |
| 2005/0222989 A1 * | 10/2005 | Haveliwala et al. | 707/3 |
| 2005/0228788 A1 * | 10/2005 | Dahn et al. | 707/3 |
| 2005/0278633 A1 * | 12/2005 | Kemp | 715/713 |
| 2006/0041607 A1 * | 2/2006 | Miller et al. | 707/205 |
| 2006/0041608 A1 * | 2/2006 | Miller et al. | 707/205 |
| 2006/0287971 A1 * | 12/2006 | Armstrong | 707/1 |

(Continued)

OTHER PUBLICATIONS

Article entitled "Optimizing Web Search Using Web Click-through Data", by Xue et al., dated Nov. 13, 2004.*

*Primary Examiner* — Mahesh Dwivedi
(74) *Attorney, Agent, or Firm* — Duncan Galloway Egan Greenwald, PLLC; Kevin T. Duncan

(57) ABSTRACT

Systems and techniques are disclosed to rank documents by analyzing a query log generated by a search engine. The query log includes data relating to user behavior, queries and documents. The systems and techniques distill query log information into surrogate documents and extract features from these surrogate documents to rank the documents.

21 Claims, 8 Drawing Sheets

(56) References Cited

U.S. PATENT DOCUMENTS

2007/0078849 A1* 4/2007 Slothouber ................ 707/5
2007/0276829 A1* 11/2007 Wang et al. ................ 707/7
2009/0070327 A1* 3/2009 Loeser et al. .............. 707/6
2010/0241624 A1* 9/2010 Ramsey ..................... 707/732

* cited by examiner

/— 300

Sources
- Dees v. Saban Entertainment
- Morrill v. Smashing Pumpkins

Jurisdiction: California

Issues:
- Implied Copyright License
- 99K48, 99K49, 99K75, 99K88, 99K107

Key Materials
- Key Cases
  - Effects Assoc. v. Cohen
  - Oddo v. Ries
  - Foad Consulting Group v. Azzalino
  - ...
  - A&M Records v. Napster
  - ...

- Key Statutes
  - 17 U.S.C §204: Execution of transfers of copyright ownership
  - 17 U.S.C §101: Definitions
- Key Briefs/Trial Docs
  - 2004 WL 2254503: Marder v Lopes & Sony Music: Appellees Brief
  - 200e WL 22724273: Blatty v Warner Bros: Appellee's Brief
  - ...
- Key Analytical Materials
  - 18 AmJur 2d Copyright & Intellectual Property § 155
  - 52 J. Copyright Soc't USA 403: Selected Law of Copyright Assignments and Licenses
  - ...

Additional Related Materials

FIGURE 3

| Session id | Event | Text | Document id | Rank | Timestamp |
|---|---|---|---|---|---|
| s1 | Search | actionable account | NA | NA | t1 |
| s1 | Result List | NA | NA | NA | t2 |
| s1 | View | NA | 23121085 | 1 | t3 |
| s1 | View | NA | 14977775 | 3 | t4 |
| s1 | Print | NA | 14977775 | NA | t5 |
| s1 | Result List | NA | NA | NA | t6 |
| s1 | View | NA | 17693382 | 4 | t7 |
| s1 | Print | NA | 26537949 | NA | t8 |
| s1 | View | NA | 13313073 | 5 | t9 |
| s1 | View | NA | 11524432 | 6 | t10 |
| s1 | View | NA | 5384978 | 9 | t11 |
| s1 | Print | NA | 5384978 | NA | t12 |

FIGURE 4

| Document id | Query id | Query text | Associated Events |
|---|---|---|---|
| 1800101931 | q1 | actionable account | view-2 |
| | q2 | allegation is admitted if not denied in answer | view-2 |
| | q3 | delivery unrecorded deed | view-1 |
| | q4 | statute of frauds xerox signature | view-2 |
| | q5 | statute of frauds alter document | view-2 print-1 |
| | q6 | statute of frauds photocopy signature | view-1 print-1/print-1 |
| | ... | | |

FIGURE 5

| Feature Name | Descriptions |
|---|---|
| viewFre | viewed frequency |
| citelistFre | frequency of a document appearing in the top 100 of search results |
| printFre | printed frequency |
| citeFre | cited frequency |
| vpcFre | the frequency of being viewed, cited, and printed |
| isNextClicked | the frequency of its next doc being viewed based on citelists |
| isPrevClicked | the frequency of its previous doc being viewed |
| isPrevNextClicked | the frequency of both its previous and next docs being viewed |
| viewFromHFind | viewed frequency from a hyperlink find event |
| viewFromOFind | viewed frequency from a non-hyperlink type of find event |
| viewToHFind | a viewed doc leading to a hyper-link find event |
| isRevisited | viewed at least twice in a session |
| isFirstClicked | the first viewed doc after a search event |
| avgRank | average rank, considering ranks in citelists only |

| | |
|---|---|
| coCite | the average frequency of a doc being cocited together with the docs in the source documents in a session |
| coPrint | the average frequency of a doc being printed together with the docs from the source documents in a session |

| | |
|---|---|
| gviewFre | viewed frequency in all the sessions |
| gprintFre | printed frequency in all the sessions |
| gciteFre | cited frequency in all the sessions |
| notFromqSearch | not from a search event |
| viewTimeDeviation | viewed time divided by average time (if $time > 600s$, treat it as 0 and ignore) |
| clickRelativeFre | click relative frequency ( $log(clickFre(rank)/log(max)$ if $clickFre < 1000$; otherwise 0.1) |
| clickDeviation | $Nor(clickFre(rank)_q) - Nor(clickFre(rank)_g)$ |
| qdSim | the similarity of the q and the built surrogate documents |

FIGURE 6

| Event Type | Description |
|---|---|
| search | a user types a query and performs a search |
| citelist | a list of search results, consisting of documents and their ranks |
| view | a user clicks a document |
| cite | a user keycites a document |
| print | a user prints a document |
| find | a user clicks the hyperlink of a document (there are more than 20 types of find events, we only consider this one) |

FIGURE 8

FEATURE ENGINEERING AND USER BEHAVIOR ANALYSIS

CROSS-REFERENCE TO RELATED APPLICATION

This application is a continuation-in-part of U.S. application Ser. No. 11/538,749, filed Oct. 4, 2006, which claims priority to U.S. Provisional Application 60/723,322 filed on Oct. 4, 2005, the contents of which are all incorporated herein in their entirety, and also claims priority to U.S. Provisional Application Ser. No. 61/184,693, filed on Jun. 5, 2009, the contents of which is incorporated herein in its entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2010, West Services Inc.

TECHNICAL FIELD

Various embodiments of the present invention concern information-retrieval systems, such as those that provide legal documents or other related content.

BACKGROUND

The use of search engines has become a part of everyday life. Users use search engines to find information electronically from various information sources. For example, the American legal system, as well as some other legal systems around the world, relies heavily on written judicial opinions, the written pronouncements of judges, to articulate or interpret the laws governing resolution of disputes. Each judicial opinion is not only important to resolving a particular legal dispute, but also to resolving similar disputes, or cases, in the future. Because of this, judges and lawyers within our legal system are continually researching an ever-expanding body of past opinions, or case law, for the ones most relevant to resolution of disputes.

To facilitate these searches West Publishing Company of St. Paul, Minn. (doing business as Thomson West) collects judicial opinions from courts across the United States, and makes them available electronically through its Westlaw® legal research system. Users access the judicial opinions, for example, by submitting keyword queries for execution by a search engine against a jurisdictional database of judicial opinions or case law.

Typically, search engines maintain information concerning what queries a user may have entered, the documents that were identified and viewed from the search, the actions taken with documents, such as viewing, printing, etc., whether an advertisement or sponsored link provided with search results was selected, and other information in one or more query logs.

While information in query logs can be valuable in determining the relevance of search results to entered user queries, and therefore, the effectiveness of a search engine to identify relevant documents, current techniques in analyzing query log data do not overcome the inherent quality issues of this data, namely, that query log data tends to be noisy, sparse, incomplete, and volatile.

Accordingly, there is a need for improvement of information-retrieval systems for document retrieval systems that can effectively leverage query log data.

SUMMARY

Systems and techniques are disclosed to rank documents by analyzing a query log generated by a search engine. The query log includes data relating to user behavior, queries and documents. The systems and techniques distill query log information into surrogate documents and extract features from these surrogate documents to rank documents.

Various aspects of the invention relate to computing document attributes using feature values and ranking documents.

For example, according to one aspect, a method of providing search results includes receiving a first signal indicative of a first set of document results from a search engine and a user query, generating attributes of each document in the first set of document results using feature values derived from a surrogate document, the surrogate document identifying at least one document and corresponding user actions and search queries, and ranking each document of the first set of document results using the feature values. The method also includes transmitting a second signal indicative of the ranked first set of document results.

The method can include generating the surrogate document by identifying and aggregating a plurality of search queries, corresponding user actions, and user action frequencies associated with a document. Identifying the plurality of search queries can include normalizing the queries for space, punctuation, syntax, and term variations.

In one embodiment, for example, the plurality of search queries and corresponding user actions are organized by user session in a search history log. The method can further include summarizing the plurality of search queries and corresponding user actions across a plurality of user sessions.

In another embodiment, for example, the method further includes generating the feature values from the surrogate document, the feature values including query-based features and term-based features. The query-based features are selected and weighted based on lexical similarity of the search queries to the user query. The query-based features can also be based on a combination of user actions associated with the document. Both the query-based features and the term-based features are weighted based on the user actions associated with the document.

In one embodiment, the ranking of the first set of document results entails executing a machine learned ranking function using the feature values.

In another aspect, a method of providing search results includes receiving first signal indicative of a first query, identifying user sessions of a search history log that comprise at least one search query similar to the first query, and generating a surrogate document based on the identified user sessions, the surrogate document describing at least one document and corresponding user actions and search queries associated with the at least one document in a search history log. The method also includes generating attributes from the surrogate document, ranking each document of a first set of documents described in the search history log based on the attributes, and transmitting a second signal indicative of the ranked first set of documents.

In one embodiment, ranking each document of the first set of document results entails executing a machine learned ranking function using the feature values.

In yet another embodiment, the received first signal further indicates a second set of document search results from a search engine, the method further including modifying the second set of document search results based on the ranked first set of documents, computing a rank score for each document of the second set of document search results, ranking each document of the second set of document search results based on the computed rank score, and transmitting a third signal indicative of the modified results.

Systems, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

BRIEF DESCRIPTION OF DRAWINGS

FIG. 3 is a diagram of an exemplary user interface 300 corresponding to one or more embodiments of the invention.

FIG. 4 illustrates an exemplary user session in a query log;

FIG. 5 illustrates an exemplary surrogate document;

FIG. 6 illustrates exemplary user behavior features of a document;

FIG. 8 illustrates exemplary events in a query log.

Like reference symbols in the various drawings indicate like elements.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Additionally, this document incorporates by reference U.S. Provisional Patent Application 60/436,191, which was filed on Dec. 23, 2002; U.S. patent application Ser. No. 10/027,914, which was filed on Dec. 21, 2001; U.S. Provisional Patent Application 60/437,169, which was filed on Dec. 30, 2002; and U.S. Provisional Patent Application 60/480,476, which was filed on Jun. 19, 2003. One or more embodiments of the present application may be combined or otherwise augmented by teachings in the referenced applications to yield other embodiments.

Exemplary Information-Retrieval System

Figure 1:
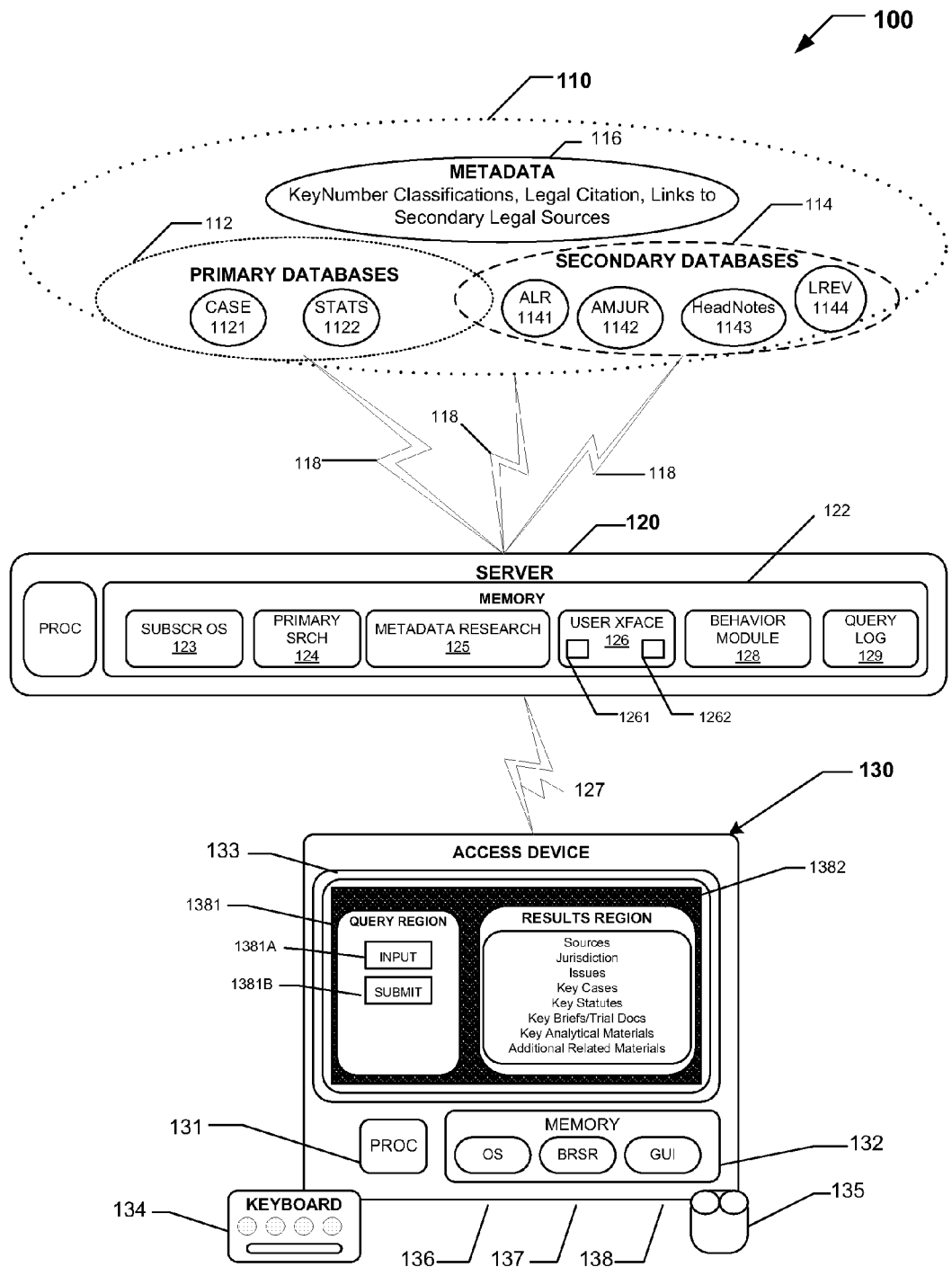
FIG. 1 is a diagram of an exemplary information-retrieval system 100 corresponding to one or more embodiments of the invention.

FIG. 1 shows an exemplary online information-retrieval (or legal research) system 100. System 100 includes one or more databases 110, one or more servers 120, and one or more access devices 130.

Databases 110 includes a set of primary databases 112, a set of secondary databases 114, and a set of metadata databases 116. Primary databases 112, in the exemplary embodiment, include a caselaw database 1121 and a statutes database 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, includes an ALR (American Law Reports) database, 1141, an AMJUR database 1142, a West Key Number (KNUM) Classification database 1143, and an law review (LREV) database 1144. Metadata databases 116 includes case law and statutory citation relationships, KeyCite data (depth of treatment data, quotation data, headnote assignment data), and ResultsPlus secondary source recommendation data. Also, in some embodiments, primary and secondary connote the order of presentation of search results and not necessarily the precedential value of the search results.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via communications link 118, such as a wireless or wireline communications network, which may be a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, metadata research module 125, a user-interface module 126, a behavior module 128, and a query log 129.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, metadata research module 125, user-interface module 126, behavior module 128, and query log 129.

Subscriber database 123 includes subscriber-related data for controlling, administering, and managing pay-as-you-go or subscription-based access of databases 110. In the exemplary embodiment, subscriber database 123 includes one or more preference data structures.

Primary search module 124 includes one or more search engines and related user-interface components, for receiving and processing user queries against one or more of databases 110. One or more search engines associated with search module 124 provide Boolean, tf-idf (term frequency-inverse document frequency), and natural-language search capabilities. In the exemplary embodiment, search module 124 stores processed user queries, search results, and user actions relating to search results in query log 129.

Query log 129 is a repository of search engine and user activity. In one embodiment, the query log 129 includes processed user queries as well as user actions taken on search results. The query log 129 can be implemented as a relational database. In another implementation, the query log 129 is implemented in an Ascii text file. In yet another implementation, the query log 129 is a configured area in a non-volatile area of memory module 122. Further details of the query log 129 are discussed below.

Metadata research module 125 includes one or more search engines for receiving and processing queries against metadata databases 116 and aggregating, scoring, and filtering, recommending, and presenting results. In the exemplary embodiment, module 125 includes one or more feature vector builders and learning machines to implement the functionality described herein. Some embodiments charge a separate or additional fee for accessing documents from the second database.

User-interface module 126 includes machine readable and/or executable instruction sets for wholly or partly defining web-based user interfaces, such as search interface 1261 and results interface 1262, over a wireless or wireline communications network on one or more accesses devices, such as access device 130 and communications link 127.

Behavior module 128 analyzes and ranks entries in the query log 129. In one exemplary embodiment, behavior module 128 generates attributes (e.g., feature values) of documents in search results identified by the search module 124 using feature values derived from information stored in the query log. The behavior module 128 then ranks the search results using the attributes. In another exemplary embodiment, the behavior module 128 generates attributes of a surrogate document, and then ranks documents in the query log 129 based on the attributes. Further details of the behavior module 128 are described in detail below.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 that includes one or more processors (or processing circuits), a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI)138. In the exemplary embodiment, operating system 136 takes the form of a version of the Microsoft® Windows® operating system, and browser 137 takes the form of a version of Microsoft® Internet Explorer®. Operating system 136 and browser 137 not only receive inputs from keyboard 134 and selector 135 (typically a "mouse"), but also support rendering of GUI 138 on display 133. Upon rendering, GUI 138 presents data in association with one or more interactive control features (or user-interface elements). The exemplary embodiment defines one or more portions of interface 138 using applets or other programmatic objects or structures from server 120.

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B. Search-results region 1382 is also defined in memory and upon rendering presents a variety of types of information in response to a case law query submitted in region 1381. In the exemplary embodiment, the results region identifies one or more source case law documents (that is, one or more good cases, usually no more than five), jurisdictional information, issues information, additional key cases, key statutes, key briefs or trial documents, key analytical materials, and/or additional related materials. (FIG. 3, which is described below, provides a more specific example of a results region.) Each identified document in region 1382 is associated with one or more interactive control features, such as hyperlinks, not shown here. User selection of one or more of these control features results in retrieval and display of at least a portion of the corresponding document within a region of interface 138 (not shown in this figure). Although FIG. 1 shows query region 1381 and results region 1382 as being simultaneously displayed, some embodiments present them at separate times.

Exemplary Operation

Figure 2:
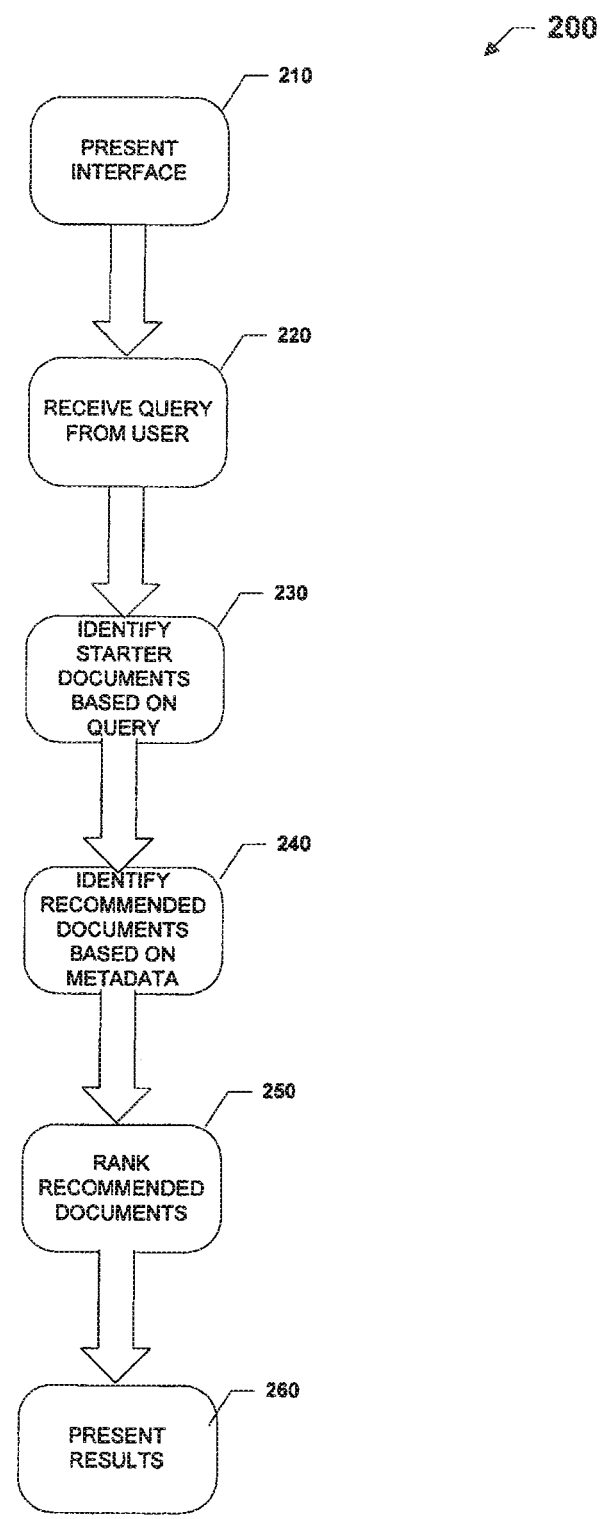
FIG. 2 is a flowchart corresponding to one or more exemplary methods of operating system 100 and one or more embodiments of the invention.

FIG. 2 shows a flow chart 200 of one or more exemplary methods of operating a system, such as system 100. Flow chart 200 includes blocks 210-250, which, like other blocks in this description, are generally arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow (in FIG. 2 and elsewhere in this description) applies to software, hardware, and firmware implementations.

Block 210 entails presenting a search interface to a user. In the exemplary embodiment, this entails a user directing a browser in client access device to an internet-protocol (IP) address for an online information-retrieval system, such as the Westlaw® system and then logging onto the system. Successful login results in a web-based search interface, such as interface 138 in FIG. 1 being output from server 120, stored in memory 132, and displayed by client access device 130.

Using interface 138, the user can define or submit a case law query and cause it to be output to a server, such as server 120. In other embodiments, a query may have been defined or selected by a user to automatically execute on a scheduled or event-driven basis. In these cases, the query may already reside in memory of a server for the information-retrieval system, and thus need not be communicated to the server repeatedly. Execution then advances to block 220.

Block 220 entails receipt of a query. In the exemplary embodiment, the query includes a query string and/or a set of target databases (such as jurisdictional and/or subject matter restricted databases), which includes one or more of the select databases. In some embodiments, the query string includes a set of terms and/or connectors, and in other embodiments includes a natural-language string. Also, in some embodiments, the set of target databases is defined automatically or by default based on the form of the system or search interface. Also in some embodiments, the received query may include temporal restrictions defining whether to search secondary resources. In any case, execution continues at block 230.

Block 230 entails identifying a starter set of documents based on the received query. In the exemplary embodiment, this entails the server or components under server control or command, executing the query against the primary databases and identifying documents, such as case law documents, that satisfy the query criteria. A number of the starter set of documents, for example 2-5, based on relevance to the query are then selected as starter cases. Execution continues at block 240.

Block 240 entails identifying a larger set of recommended cases (documents) based on the starter set of cases. In the exemplary embodiment, this entails searching the metadata databases based on the citations in and to the starter cases, based on secondary legal documents that are associated with the starter cases, legal classes (West's KeyNumber System®) classifications) associated with the starter cases, and statutes query to obtain a set of relevant legal classes. In the exemplary embodiment, this larger set of recommended cases, which is identified using metadata research module 126, may include thousands of cases. In some embodiments, the set of recommended cases is based only on metadata associated with the set of starter cases (documents).

Block 250 entails ranking the recommended cases. In the exemplary embodiment, this ranking entails defining a feature vector for each of the recommended cases (documents) and using a support vector machine (or more generally a learning machine) to determine a score for each of the documents. The support vector machine may include a linear or nonlinear kernel. Exemplary features for feature vectors include:

NumObservations—how many ways to get from source to recommendation
NumSources—how many sources (starter documents) connect to recommendation
NumReasons—how many kinds of paths to recommendation
MaxQuotations—Maximum of numQuotations value in citations
TFIDFScore—Based on text similarity of text (as used by ResultsPlus (RPD))
RPWeightedScore—Based on number of RPD recommendations shared and their scores
NumSharedRPDocs—Same as RPWeightedScore, but not based on score
KNWeightedScore—Based on the number of key numbers (legal classification codes) shared and their importance
NumSharedKeyNumbers—same thing but not based on score
NumSourcesCiting—Number of sources that directly cite a recommendation
NumCitedSources—Number of sources cited by a recommendation
NumCoCitedCases—Number of cases with co-citation between a source and a recommendation
NumCoCitedByCases—Number of cases with bibliographic coupling between source and recommended documents
NumSharedStatutes—Number of statutes in common
SimpleKeyciteCiteCount—Raw Number of times recommended case was cited by any case Some embodiments use all these features, whereas others use various subsets of the features. Execution proceeds to block 260.

Block 260 entails presenting search results. In the exemplary embodiment, this entails displaying a listing of one or more of the top ranked recommended case law documents in results region, such as region 1382 in FIG. 1. In some embodiments, the results may also include one or more non-case law documents that share a metadata relationship with the top-ranked recommended case law documents; legal classification identifiers may also be presented. FIG. 3 shows a detailed example of this type of results presentation 300. Other embodiments may present a more limited result set including identifiers for the top ranked documents and a set of legal classification codes. Details of ranking search results are discussed below.

Turning now to FIG. 4, search module 124 organizes information in query log 129 around user sessions. Search module 124 can be configured to identify users implicitly, for example by using an IP address or a cookie, and/or identify users explicitly through log-in procedures. For example, in one embodiment, search module 124 organizes sessions in the query log 129 explicitly (e.g., from the time a user logs in the system until he signs off). In another embodiment, search module 124 organizes user sessions in the log implicitly (e.g. a short period of time where the user actively interacts with the system).

Within each session, the search module 124 logs various user behaviors (e.g., user actions), such as searches, prints, views, click-throughs, etc. An example of user behaviors stored by the search module 124 is shown in FIG. 8. Advantageously, the search module 124 also logs information necessary to interpret user behaviors, such as the search results displayed on pages prior to a click-through. For example, a user may enter a query, click on a third document in a displayed result screen, follow a hyperlink from the third document to another document not in the result list, and then print or bookmark that latter document. Different events (e.g., user actions) taken by the user indicate whether a document is relevant at different levels. For example, printing or bookmarking a document reflects more interest on the part of the user than just viewing that document.

For example, turning now to FIG. 4, an example portion of the query log 129 generated by the search module 124 is shown. As shown in the FIG. 4 example, a user started session s1 with a search (actionable account), viewed (clicked on) documents ranked 1 and 3, printed the document at rank 3 and then viewed the document at rank 4. From the interactions in this session, the behavior module 128 can determine that documents ranked 1, 3 and 4 are relevant to the user's need, while documents having ranks 2, 7 and 8 likely are not. Although the example shown in FIG. 4 is a portion of the query log 129, the query log 129 can include information relating to a set of users, one or more documents, and one or more actions taken by users with respect to documents, such as viewing, printing, etc.

The behavior module 128 of the present invention is configured to rank documents based on information stored in the query log 129. For example, in one embodiment, the behavior module receives a signal indicative of a set of search results generated by the search module 124. The behavior module 128 compares attributes of each document in the search results to feature values that are derived from surrogate documents generated from the query log 129. The behavior module 128 then ranks each document in the search results using the feature values. For example, in one embodiment, the behavior module executes a machine learned ranking function that uses the feature values. Once the search results are ranked, the behavior module transmits a signal indicative of the ranked results. Details of surrogate documents and feature values generated by the behavior module 128 are discussed in detail below.

Event-Centric Surrogate Documents

Surrogate documents generated by the behavior module 128 are event-centric (i.e., include information relating to user actions). As mentioned previously, information stored in the query log 129 can be noisy. For example, if a user selects a document that is not relevant to the user's search, the selection of that document from query log is considered noise. By adding event information to surrogate documents, the behavior module 128 minimizes the effect of noise and extracts focused features from these event-centric surrogate documents. Specifically, in one embodiment, behavior module 128 creates an event-centric surrogate document (ESD) for documents that appear in the query log 129. In one embodiment, documents in the query log 129 are identified with a numerical identifier. The behavior module 128 generates an ESD by collecting all related queries as well as corresponding events and their frequency. As such, an ESD generated by the behavior module 128 is an aggregate of queries, events and counts across sessions where a real document (e.g., a numeric identifier) is identified.

The behavior module 128 determines that a query is related to a document if the query and the document are stored in the same session. In one embodiment, the behavior module 128 normalizes the queries in the log 129 for space, punctuation and syntax. The behavior module 128 also is configured to utilize stemming techniques to normalize the queries. An example of an event-centric surrogate document is shown in connection with FIG. 5.

In one embodiment, for example, the ESD is organized by queries and their associated events: each query is followed by one or more event types, as well as the count for each event type. For example, as shown in the FIG. 5 example, the real document with numeric identifier '1800101931' is viewed twice but printed once when it appears in sessions with query q5. The surrogate documents of the present invention can include one or more queries. Further, in some embodiments where the query log 129 includes Boolean terms as well as natural language terms in queries, the behavior module 128 removes Boolean syntax (e.g., OR, AND, NEAR, etc. . . . ) during normalization.

Advantageously, ESDs of the present invention differ from traditional surrogate documents in that the ESDs capture both user behaviors as well as queries. This enriched representation allows the behavior module 128 to reduce the impact of noise in the query log 129 by selecting relevant queries and assigning different weights to specific events.

The behavior module 128 extracts various features from ESDs, thereby allowing the behavior module 128 to take full advantage of ESDs. In one embodiment, for example, during feature generation, the behavior module 128 utilizes 1) a subset of the queries in an ESD that is closely related to a user query, 2) events associated with the selected queries and 3) the implicit relationships between documents in the ESD.

Further, to address sparsity, where there is minimal information available in the query log 129 relating to a document/query/event, the behavior module 128 generates features not only at the query level, but also on the query term level, thereby taking full advantage of the information available in ESDs and incorporating events in the computation of features. Details of this process are discussed below.

Query-Based Features

In one embodiment, to compute query-based features, the behavior module 128 computes a query-document feature for each event in an ESD and then weights each query-document feature to compute a final feature vector. For example, assuming a user query $q_u$, an ESD representing query information for document d, and that $Q_{ud}$ is a subset of queries in the ESD related to $q_u$, the behavior module 128 computes a query-document feature $f(q_i, d)$ by aggregating event-based feature values $h(e_j, d)$ for individual events $e_j$ in the ESD. Each query $q_i$ contributes to the final feature $fea(q_u, d)$ with a weight $g(q_i, q_u)$ as described in Equation 1.0.

$$fea(q_u, d) = \sum_{q_i \in Q_{ud}} f(q_i, d) * g(q_i, q_u) \quad \text{(Equation 1.0)}$$

Advantageously, the behavior module 128 can generate multiple variations of these features based on how $Q_{ud}$, f, and g are implemented. For example, in one embodiment, the behavior module 128 operates in a strict manner (affects few modifications) if the set $Q_{ud}$ is composed only of the user query (exact match), and if the query-document feature only selects documents that have been printed and Keycited for that query. In another example, the behavior module 128 may be loose (affect several changes) if the set $Q_{ud}$ is composed of all queries with one word in common with the user query and all events can contribute a query-document feature value.

Selecting Subset $Q_{ud}$

The behavior module 128 selects related queries from the ESD based on lexical similarity. For example, in one embodiment, the behavior module 128 determines whether the subset of queries, $Q_{ud}$, in the ESD d is an exact match to a single user query $q_u$ after normalization. In another embodiment, the behavior module 128 determines the subset of queries $Q_{ud}$ by identifying the top K similar queries based on the similarity between the user query $q_u$ and candidate queries $q_i$ in the surrogate document d, K being a method parameter that can be changed to provide more or less strict behavior. In yet another embodiment, the $Q_{ud}$ determined by the behavior module 128 includes candidate queries $q_i$ when their similarity to the user query $q_u$ exceeds a predefined threshold value T: $sim(q_i, q_u) > T$.

In one embodiment, to compute similarity, the behavior module 128 uses the vector space model and the cosine metric. For example, in one embodiment, the behavior module 128 represents queries as vector of terms, where each term is associated with a weight (for example term frequency). In one embodiment, the similarity between two queries is computed using the dot product between the vector representations, normalized for length, also known as the cosine similarity.

The dot product is an algebraic operation that takes two equal-length sequences of numbers (here the query vectors) and returns a single number obtained by multiplying corresponding entries and adding up those products. The behavior module 128 represent both query vectors solely in terms of term frequency (tf). Advantageously, the behavior module 128 ignores the inverse document frequency component, idf, so that a term appearing in several queries is not penalized. In another embodiment, the behavior module 128 uses a translation model to evaluate how related two queries are.

Modeling User Events Using Features $f(q_i, d)$

In one embodiment, the behavior module 128 aggregates event-based features across individual event features based on Equation 2.0:

$$f(q_i, d) = \sum_{\langle q_i, e_j \rangle \in d} h(e_j, d) \qquad \text{(Equation 2.0)}$$

Events $e_j$ processed by the behavior module 128 include simple events, such as document views, prints, bookmarks, following a hyperlink, etc., as well as complex events that are a combination of simple events on a same document in a session. For example, complex events can include, but are not limited to, a document view followed by a document print; a document view followed by a navigation and a document print, etc. The event-based features are aggregated by the behavior module 128 in an unweighted linear combination.

In one embodiment, to determine $h(e_j, d)$—a feature that represents how important document d is given that e is an observed event for document d in the ESD, the behavior module 128 computes the raw frequency of the event for query $q_i$ in surrogate document d. In another embodiment, the behavior module 128 determines $h(e_j, d)$ by normalizing the raw frequency of the event using a log function.

Weighting the Contribution of Each Query $q_i$ in $Q_{ud}$

The behavior module 128 weights queries in the ESD so that queries more similar to the user query contribute more to the final feature value than queries that are less similar. For example, in one embodiment, the behavior module 128 assigns an equal value for all queries, therefore introducing no preference for similar queries. In another embodiment, the behavior module 128 weights each query by the similarity score $sim(q_i, q_u)$ described previously. In yet another embodiment, the behavior module weights the queries in the ESD using the log of the similarity score: $\log(sim(q_i, q_u)+1)$.

Query Sharing

The features described above relate to individual documents. The behavior module 128 also is configured to determine relationships between documents by selecting a group of source documents (e.g., search results) and comparing candidate documents with these source documents. For example, in one embodiment, the behavior module 128 computes the number of queries in common between an ESD of a candidate document and ESDs of source documents, since documents that share queries with source documents are more likely to be relevant to the user query $q_u$. In one embodiment, the behavior module 128 uses search results from the search module 124 as the source documents.

Term-Based Features

In one embodiment, to address sparsity, the behavior module 128 uses term-based similarity between user queries and ESDs as additional features in ranking. Advantageously, the behavior module 128 incorporates event types as a weighting function of surrogate documents thus providing a link between query terms and various user behaviors.

Exact Query-Document Similarity $sim(q_u, d)$

To compute similarity between queries and documents, the behavior module 128 implements one or more various information retrieval techniques. Example information retrieval techniques include, but are not limited to, tf-idf using the cosine metric defined above; probabilistic ranking using inference networks, and language modeling.

In several embodiments, the behavior module 128 implements the similarity measures described in the previous section. In particular, the behavior module 128 represents ESD vectors (e.g., features) in terms of a weighted term frequency (tf), and allots more contribution to terms associated with events that require more engagement from users. For example, in one embodiment, the behavior module 128 weights terms associated with print events more than terms associated only with view events.

Query Expansion $sim(\sim q_u, d)$

In one embodiment, for feature values that include zero values (i.e., the ESDs do not include exact user query terms) the behavior module 128 implements a query expansion function to compute similarity between queries and documents. For example, in one embodiment, the behavior module 128 computes a Term Selection Value (TSV) from a group of source documents (ESDs) using Equation 3.0:

$$TSV_t = \left(\frac{F_t}{N}\right)^{r_t}\binom{R}{r_t} \qquad \text{(Equation 3.0)}$$

where N is the number of documents in a collection (e.g., the search results or a subset of search results), $f_t$ is the number of documents containing term t in the collection, R is the number of source documents, and $r_t$ is the number of source documents containing term t.

Rather than selecting K terms, in one embodiment, the behavior module 128 selects a variable number of terms corresponding to the top K TSV values, where K is a method parameter that can be modified to provide more or less restrictive suggestions. As such, the query expansion feature corresponds to the similarity score between an expanded query $\sim q_u$ and the ESD.

Document-Document Similarity $sim(d, D_s)$

In one embodiment, the behavior module 128 also computes a third term-based feature that makes indirect use of the user query $q_u$ via source documents. First, the behavior module 128 selects a set of source documents Ds, typically the highest ranked results by the primary search module 124. The behavior module 128 then computes an average similarity between the ESD d and the ESDs in the set Ds. The behavior module 128 avoids over-crediting source documents by down-weighting their contribution in the average if the candidate surrogate document d is part of the set of source documents Ds. In one embodiment, the behavior module 128 uses the cosine similarity described previously to weigh the documents; however the module 128 down-weighs the contribution of the source documents by dividing their contribution by a system parameter or by removing the similarity of the document to itself from the average. An advantage of this technique is that parameter tuning is not required beyond the selection of source documents.

Although the above detail description refers to one or more embodiments in which search results are ranked by the behavior module 128 using the above-mentioned features, it will be appreciated by one skilled in the art that the present invention is not limited to using the behavior module 128 for solely ranking search engine results. For example, in one embodiment, in response to receiving a user query, the behavior module 128 identifies and ranks relevant documents identified in the query log 129 using the ESDs and features described previously. The behavior module 128 then provides the ranking of query log 129 documents in response to a request.

Figure 7:
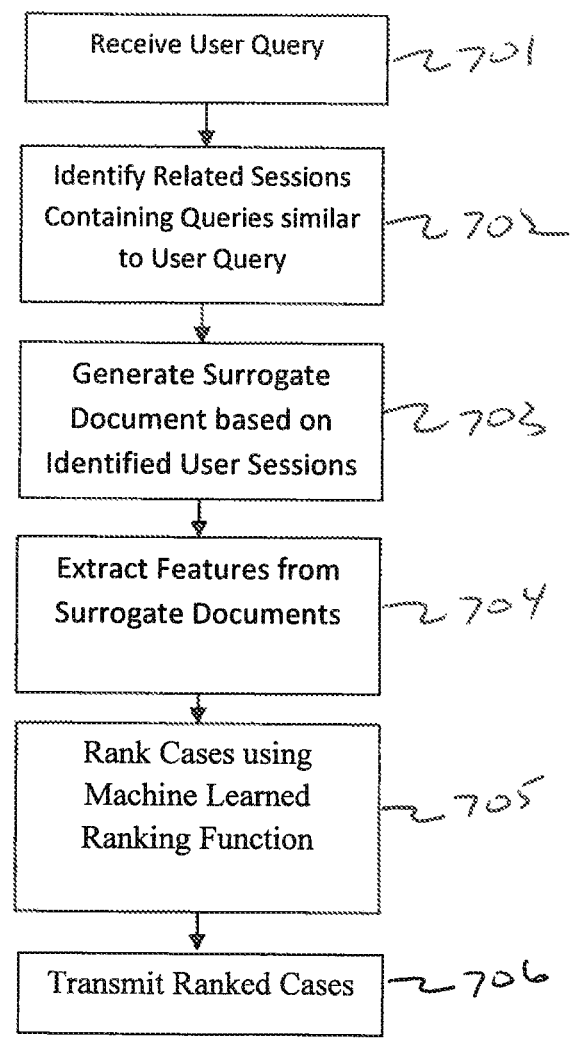
FIG. 7 is a flowchart for ranking documents according to one or more embodiments of the invention.

An example of the process executed by the behavior module 128 is shown in connection with FIG. 7. First, the behavior module receives a user query 701. In response to the user query, the behavior module 128 identifies related sessions from the query log 129 that are similar to the user query 702. For example, as explained previously, the behavior module 128 is configured to represent each document in the query log 129 as a feature vector, extracted from related sessions with a query q. In one embodiment, the related sessions of the query q are defined by the behavior module 128 as being sessions that contain at least one query q1 that is at least 80% similar to the user query q. The behavior module 128, in one embodiment, defines similarity between q and q1 using Equation 4.0:

$$\frac{CN}{SQRT(|q1|*|q|)} \quad \text{(Equation 4.0)}$$

where CN is the number of common words of q1 and q, and $|q_i|$ indicates the absolute value of the number of words in $q_i$.

Next, the behavior module 128 generates surrogate documents (ESDs) based on the identified user sessions 703, as described previously. Once ESDs are generated, the behavior module extracts/generates features from the ESDs 704. A list of feature vectors generated by the behavior module 128, along with accompanied descriptions, is shown in FIG. 6. Each feature vector includes features that describe users' actions toward each document. In one embodiment, for example, the feature values are averaged over the related sessions of q.

After extracting features for each document, the behavior module 128 ranks each document described in the query log 129 by executing a machine learned ranking function that uses the feature values 705. The machine learned ranking function can be a linear combination of the feature values where the contribution of each value is learned by the machine. In one embodiment, the ranking function uses support vector machines (SVM). Alternatively, the ranking function can be a function learned by a neural network. The behavior module 128 then transmits a signal indicative of the ranked cases 706.

In another embodiment, in addition to receiving the user query, the behavior module 128 also receives a set of document search results. The behavior module 128 modifies the set of document search results based on the ranking of the documents in the query log 129. This can include deleting documents from the search results that have been deemed irrelevant based on computed feature values, and also adding additional documents from the query log to the set of document search results. The behavior module 128 then computes a rank score for each document in the search results, ranks each document in the set based on the computed rank score, and transmits a signal indicative of the ranking.

In one embodiment, the behavior module 128 computes the rank score by combining a rank value associated with each document in the search results by the s by the search engine with a second ranking determined by a machine learned ranking function that uses the before-mentioned feature vectors/values.

For example, in one embodiment, to compute the rank score, the behavior module 128 combines the rankings of the search engine with those computed by the behavior module 128 using the formula shown in Equation 5.0:

$$\text{Rank Score}(d) = (1 - 0.9^{R_w}) + (1 - 0.9^{R_a}) \quad \text{(Equation 5.0)}$$

where $R_w$ is the rank value assigned from the search engine and $R_a$ is the rank value determined by the behavior module 128 from the query log 129. In one embodiment, in the event a document appears in only one of the two sources, the behavior module 128 assigns the document a default rank score. The behavior module 128 then transmits an N number of top rank scores, where N is a predetermined whole number.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A method of providing search results comprising:
   receiving a first signal indicative of a first set of document results from a search engine responsive to a received user query;
   generating attributes of each document in the first set of document results using feature values derived from a surrogate document, the surrogate document derived from a search history log comprising at least one search query similar to the received user query and identifying:
      at least one document;
      one or more queries related to the received user query and associated with the at least one document; and
      one or more corresponding actions associated with each of the one or more queries by a set of multiple users;
   ranking the first set of document results using the attributes to generate a ranked first set of document results; and
   transmitting a second signal indicative of the ranked first set of document results.

2. The method of claim 1, further comprising generating the surrogate document by identifying and aggregating a plurality of search queries, corresponding user actions, and user action frequencies associated with the at least one document.

3. The method of claim 2, wherein identifying the plurality of search queries comprises normalizing the queries for space, punctuation, syntax, and term variations.

4. The method of claim 2, wherein a plurality of search queries and corresponding user actions are organized in accordance with a set of user sessions in the search history log.

5. The method of claim 4, further comprising summarizing the plurality of search queries and corresponding user actions across a plurality of user sessions.

6. The method of claim 1, further comprising generating the feature values from the surrogate document, the feature values comprising query-based features and term-based features, wherein the attributes are feature values.

7. The method of claim 6, wherein the query-based features are selected and weighted based on lexical similarity of the search queries to the user query.

8. The method of claim 7, wherein the query-based features are based on a combination of user actions associated with the at least one document.

9. The method of claim 6, wherein the term-based features are weighted based on the user actions associated with the at least one document.

10. The method of claim 1, wherein ranking the first set of document results comprises executing a machine learned ranking function using the feature values.

11. A method of providing search results comprising:
receiving a first signal indicative of a first query;
identifying user sessions of a search history log that comprise at least one search query similar to the first query;
generating a surrogate document derived from the search history log and based on the identified user sessions, the surrogate document describing:
at least one document;
one or more queries related to the first query and associated with the at least one document; and
one or more corresponding actions associated with each of the one or more queries by a set of multiple users, said one or more queries and one or more corresponding actions associated with the at least one document in the search history log;
generating attributes from the surrogate document;
ranking a first set of documents described in the search history log based on the attributes to generate a ranked first set of documents; and
transmitting a second signal indicative of the ranked first set of documents.

12. The method of claim 11, wherein the attributes are feature values based on the surrogate document.

13. The method of claim 11, wherein ranking each document of the first set of document results comprises executing a machine learned ranking function using the feature values.

14. The method of claim 11, wherein the received first signal further indicates a second set of document search results from a search engine, the method further comprising:
modifying the second set of document search results based on the ranked first set of documents;
computing a rank score for each document of the second set of document search results;
ranking each document of the second set of document search results based on the computed rank score to generate ranked modified results; and
transmitting a third signal indicative of the modified results.

15. The method of claim 14, wherein the rank score is a combined rank value based on a first rank value determined by the search engine and a second rank value determined by the machine learned ranking function.

16. An on-line legal research system comprising:
a server coupled to the data store, the server including a processor and memory storing instructions that, in response to receiving a request for access to a service, cause the processor to:
generate attributes of each document in a first set of document results using feature values derived from a surrogate document, the surrogate document derived from a search history log comprising at least one search query similar to a user query, and identifying:
at least one document;
one or more queries related to the user query and associated with the at least one document; and
one or more corresponding actions associated with each of the one or more queries by a set of multiple users, in response to receiving a first signal indicative of the first set of document results from a search engine and the user query;
rank the first set of document results using the attributes to generate a ranked first set of results; and
transmit a second signal indicative of the ranked first set of document results.

17. An on-line legal research system comprising:
a server coupled to the data store, the server including a processor and memory storing instructions that, in response to receiving a request for access to a service, cause the processor to:
identify user sessions of a search history log that comprise at least one search query similar to a first query in response to receiving a first signal indicative of the first query;
generate a surrogate document derived from the search history log and based on the identified user sessions, the surrogate document describing:
at least one document;
one or more queries related to the first query and associated with the at least one document; and
one or more corresponding actions associated with each of the one or more queries by a set of multiple users, said one or more queries and one or more corresponding actions associated with the at least one document in the search history log;
generate attributes from the surrogate document;
rank a first set of documents described in the search history log based on the attributes to generate a ranked first set of documents; and
transmit a second signal indicative of the ranked first set of documents.

18. An on-line legal research system comprising:
means for receiving a first signal indicative of a first set of document results from a search engine and a user query;
means for generating attributes of each document in the first set of document results using feature values derived from a surrogate document, the surrogate document derived from a search history log comprising at least one search query similar to the user query and identifying:
at least one document;
one or more queries related to the user query and associated with the at least one document; and
one or more corresponding actions associated with each of the one or more queries by a set of multiple users;
means for ranking the first set of document results using the attributes to generate a ranked first set of document results; and
means for transmitting a second signal indicative of the ranked first set of document results.

19. An on-line legal research system comprising:
means for receiving a first signal indicative of a first query;
means for identifying user sessions of a search history log that comprise at least one search query similar to the first query;
means for generating a surrogate document derived from the search history log and based on the identified user sessions, the surrogate document describing:

at least one document;
one or more queries related to the first query and associated with the at least one document; and
one or more corresponding actions associated with each of the one or more queries by a set of multiple users, said one or more queries and one or more corresponding actions associated with the at least one document in the search history log;
means for generating attributes from the surrogate document;
means for ranking a first set of documents described in the search history log based on the attributes to generate a ranked first set of documents; and
means for transmitting a second signal indicative of the ranked first set of documents.

20. The system of claim 16, wherein the instructions, in response to receiving a request for access to a service, further cause the processor to: generate the feature values from the surrogate document, the feature values selected from the group consisting of a selected subset feature, a modeled user event feature, a query weighted contribution feature, a query sharing feature, a query-document similarity feature, a query expansion feature, and a document-document similarity feature, wherein the attributes are feature values.

21. The system of claim 17, wherein the generated attributes are feature values generated from the surrogate document, the feature values selected from the group consisting of a selected subset feature, a modeled user event feature, a query weighted contribution feature, a query sharing feature, a query-document similarity feature, a query expansion feature, and a document-document similarity feature.

* * * * *